June 8, 1954

S. S. HAYNES 2,680,817

ILLUMINOMETER

Filed Aug. 24, 1951

INVENTOR
Stephen S. Haynes.

BY Robert F. Peck
ATTORNEY

Patented June 8, 1954 2,680,817

UNITED STATES PATENT OFFICE 2,680,817

ILLUMINOMETER

Stephen S. Haynes, Towson, Md., assignor to Bendix Aviation Corporation, Baltimore, Md., a corporation of Delaware Application August 24, 1951, Serial No. 243,447

3 Claims. (Cl. 250—225)

Figures 1, 2:
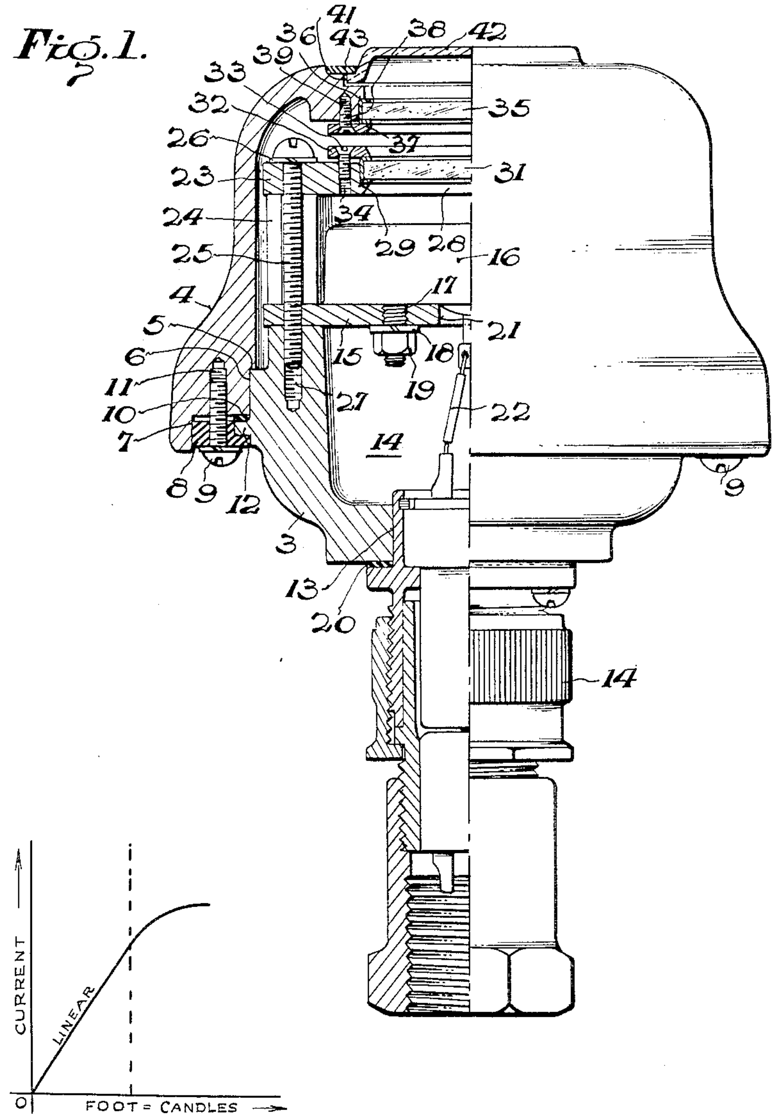

This invention relates to an improved illuminometer for measuring daylight illumination characterized by a linear measuring signal throughout the entire foot-candle range of illumination measured.

Normally, daylight illumination can have a value as high as 10,000 foot-candles or more, whereas conventional photo-electric cells used to measure illumination have a current output varying linearly up to several hundred foot-candles and non-linearly for higher values. It is desirable to maintain a linear current output, particularly when feeding the output into an indicator or recorder, and it is obvious that means must be provided to proportionately reduce the illumination impinging on a photo-electric cell if a linear output signal is to be derived.

A single light limiting filter could be provided to step down the illumination impinging upon a photo-electric cell so that the maximum illumination would be within the linear current output range of the photo-electric cell. Such an arrangement has practical disadvantages in that manufacturing tolerances for filters and photo-electric cells are normally not controlled to very close limits, thereby presenting a serious problem when manufacture of a quantity of illuminometers is undertaken. Moreover, it is a well known characteristic of photo-electric cells that aging of the cell will reduce the output current of the cell so that some means must be provided for compensating for the aging effect. The combination of loose manufacturing tolerances and aging effects of the photo-electric cell make it desirable to have a filter that is adjustable, thus simplifying the calibration of the illuminometer during manufacturing and permitting calibration of the instruments during field use. In the illuminometer described herein, a fixed light limiting filter is used to make an initial reduction of approximately 10 to 1 in illumination ultimately impinging upon the photo-electric cell. Thus, when the illuminometer is exposed to the maximum daylight illumination of 10,000 foot-candles, the actual intensity available for measuring purposes is reduced by the initial fixed filter to approximately 1,000 foot-candles.

The present invention discloses the use of a pair of light polarizing filters interposed between the initial reducing filter and the photo-electric cell. These light-polarizing filters are mounted rotatably with respect to one another so that the illumination passing through the filter pair can be adjusted through a range of essentially zero to several hundred foot-candles; that is to say, in the closed position of the filters, substantially all illumination can be blocked off from the photo-electric cell, whereas in the completely open condition of the filters, the illumination permitted to pass through to the photo-electric cell would be on the order of several hundred foot-candles. Normally, the filter pair is adjusted to proportionately reduce the illumination whereby the maximum value of foot-candles impinging upon the cell is well below the critical value at which point the current output becomes a non-linear function of illumination.

The filters and photo-electric cell are provided with a simple housing to permit the aforesaid adjustments to be made in the factory and locked in place for field use. A suitable means is provided for changing the position of the adjustable filters to compensate for aging effects in the photo-electric cell.

The invention will now be described in conjunction with the single sheet of drawings annexed hereto, in which Figure 1 is a part sectional view in elevation of the improved illuminometer, and Figure 2 is a simple graphic illustration of the current foot-candle characteristic of a photo-electric cell used with the illuminometer shown in Figure 1.

Referring now to the drawings, the illuminometer comprises a two-part housing consisting of a fixed support 3 and a rotatably mounted cover 4. The support 3 has an annular shoulder 5 cooperating with the annular recess 6 in cover 4 for holding same in place on the support. An annular recess 7 is provided in the bottom of the cover 4 to receive therein an annular spacer member 8 held in place by a series of screws 9 cooperating with a series of threaded apertures 11. The annular spacer member 8 cooperates with a projection 12 on the support 3 to clamp the cover in a fixed position with respect to the support 3 when the screws 9 are suitably tightened in place. An annular gasket 10 provides effective sealing between support 3 and cover 4 when same are locked together.

The support 3 has an aperture 13 in its base for receiving one of the commercially available combination electro-mechanical coupling units, usually known as "connectors" or the like, and generally indicated at 14. It has the usual complement of sleeves and bushings in addition to conventional male and female electrical plugs. It is to be noted that the electrical plugs are of a rubber material suitably pressure-sealed to the outer supporting shell. A gasket 20 seals the juncture of the connector assembly 14 with the support 3, there being suitable screws and cooperating apertures for affixing the connector to the base of support 3. Further detailed description of the connector is omitted for the sake of brevity, this part of the instrument forming no part of the subject invention.

The aperture 13 opens up into a hollow section 14 within the support 3 and this hollow section is covered by a cap 15 on which is supported a photo-electric cell 16, suitably secured thereto by means of a series of cooperating bolts 17, lock washers 18, and nuts 19. The cell 16 is of the hermetically sealed type in that its active surface is enclosed by an hermetically sealed housing, there being a suitable window in the housing to permit light to pass to the active surface. Moreover, the particular cell used has a built-in "color" filter so that the cell response is matched to that of the human eye, that is, from the standpoint of light rays of different frequencies. An aperture 21 is provided in the cap 15 to permit the current leads 22 to pass from the photo-electric cell 16 down into the support member 3, and on out into the external connector assembly 14.

A filter supporting member 23 is carried between support 3 and spaced from the exposed surface of the photo-electric cell 16 by means of a series of sleeves 24, bolts 25, washers 26 and threaded apertures 27. The filter supporting member 26 has an aperture 28, having an annular shoulder 29 for receiving the light polarizing filter 31. The filter 31 rests on the shoulder 29 and is clamped in place by means of the annular clamping ring 32 and the screws 33 cooperating with threaded apertures 34. A second light polarizing filter 35 is mounted in the cover 4 above filter 31 in a manner similar to the method of mounting filter 31, namely, the clamping cooperation of the annular shoulder 36 provided in cover 4, and the annular clamping ring 37 held in place by the screws 38 cooperating with threaded apertures 39.

The filter 35 is opposite a shouldered aperture 41 in the cover 4 which provides a seat for a light diffusing filter 42 suitably secured in place by means of a conventional glass-to-metal sealing arrangement, shown at 43.

The filter 42 is a so-called "cosine" filter and actually performs three functions; one, an initial proportionate reduction of about 10 to 1 in illumination; two, the illumination passing within is diffused over the active surface of the cell 16; and three, it corrects the response of the cell 16 so that its output corresponds to the illumination falling upon a true plane surface.

With the above arrangement of parts in mind, the operation of the illuminometer will be readily understood.

The pair of light polarizing filters 31, 35 can be considered as a calibrating adjustable filter unit, and when all the parts of the illuminometer are assembled, the cover 4 can be rotated with respect to the support 3 so that the filters 35, 31 are positioned with respect to each other to adjust the amount of illumination passing to the photo-electric cell 16. It is assumed that the positioning of the cover 4 is done when the screws 9 are loosely assembled to the cover and when the precise position of cover 4 is determined, the screws 9 are then locked in place to hold the instrument in its calibrated position. Any adjustments in the field to compensate for aging characteristics of the photo-electric cell 16 can be easily accomplished by the simple expedient of loosening the screws 9 and positioning the cover 4 until the instrument is in proper calibration.

Factory calibration is done as follows: A value of cell current is arbitrarily selected to correspond to 10,000 foot-candles of illumination. This current is the same for each instrument and is selected to be below the maximum value of current in the linear response range. Now, for each instrument assembled, interpolation of its own current foot-candle characteristic curve will extract the value of current that should flow in response to 2,000 foot-candlles of illumination. The instrument is then exposed to a calibrated source of 2,000 foot-candles of illumination, and the cover 4 is rotated until the cell current matches the interpolated value. The instrument is then in calibration and is ready for use. Any field adjustments can easily be made by using a calibrated source of 2,000 foot-candles and adjusting the position of the cover 4 until the current output matches the interpolated value established at the factory, corresponding to 2,000 foot-candles. The instrument is calibrated at 2,000 foot-candles for, at present, light sources calibrated to produce 2,000 foot-candles are readily available for factory and field use.

As heretofore stated, the photo-electric cell 16 and the cosine filter 42 have relatively loose manufacturing tolerances and the light polarizing filters 31, 35 provide a simple means of calibrating each instrument for uniformity of product and at that same time, provide a simple means for field calibration to adjust for aging effects of the cell. Furthermore, the two-part housing provides substantially complete hermetic sealing, preventing ingress of dirt and moisture to the interior thereof. Although the seal must be broken for field adjustments, the arrangement of parts is such that the housing need not be disassembled, thereby enhancing the possibilities of maintaining the interior thereof substantially dirt and moisture free.

What is claimed and desired to be secured by United States Letters Patent is:

1. An improved illuminometer, comprising a two-part housing, one part being in the form of a fixed vertical support and the other part being in the form of a cover rotatably mounted on said support, a photoelectric cell mounted on said support, said cell being characterized by a linear current output below a predetermined quantity of illumination impinging thereon, said cover having a window opening formed therein, a cooperating light diffusing filter located in said opening to permit illumination from a source to impinge upon said cell, a first light polarizing filter mounted on said support, a second light polarizing filter carried by said cover, said polarizing filters being spaced apart and interposed between said cell and said diffusing filter to limit the maximum illumination impinging upon said cell to a quantity below said predetermined quantity.

2. An improved illuminometer, comprising: a two-part housing, one part being in the form of a fixed hollow support and the other part being in the form of a substantially cup-shaped cover mounted on said support, means connecting the cover to the support in a manner such as to permit angular adjustment of the cover with respect to the support, a photo-electric cell mounted on said support and overlying the hollow portion thereof, said cell being characterized by a linear current output below a predetermined quantity of illumination impinging thereon, a first light polarizing filter mounted on said support in spaced relation to said cell and a second light polarizing filter secured to said cover in spaced relation to said first polarizing filter, and a cooperating light-diffusing filter mounted in a window opening formed in said cover and arranged to permit illumination from a source to impinge upon said cell through said polarizing filters, relative angular adjustment between said polarizing filters to determine the maximum illumination impinging upon said cell being obtained by angular adjustment of said cover.

3. An improved illuminometer, comprising: a fixed hollow support, a photoelectric cell mounted on said support and overlying the hollow portion thereof, said cell being characterized by a linear current output below a predetermined quantity of illumination impinging thereon, a substantially cup-shaped cover mounted on said support in telescoping engagement therewith, a light-diffusing filter mounted in a window opening formed in said cover and arranged to permit illumination from a source to impinge upon said cell, a first light polarizing filter mounted on said support and a second light polarizing filter secured to said cover, said polarizing filters being spaced apart and interposed between said cell and said diffusing filter, and means accessible exteriorly of said support and cover securing the cover to said support in a manner such as to permit angular adjustment of the cover with respect to the support to thereby obtain relative angular adjustment between said polarizing filters.

References Cited in the file of this patent

UNITED STATES PATENTS

| Number | Name | Date |
|---|---|---|
| 2,117,004 | Joachim | May 10, 1938 |
| 2,214,283 | Norwood | Sept. 10, 1940 |
| 2,249,483 | Michaelson | July 15, 1941 |
| 2,254,022 | Whitaker | Aug. 26, 1941 |
| 2,454,280 | Hardesty | Nov. 23, 1948 |
| 2,473,857 | Burchell | June 21, 1949 |
| 2,509,068 | McMahon | May 23, 1950 |
| 2,588,368 | Edgerton | Mar. 11, 1952 |
| 2,604,597 | Cahusac et al. | July 22, 1952 |